United States Patent [19]
Justus et al.

[11] 3,889,334
[45] June 17, 1975

[54] CONTROLLED DEFLECTION ROLL DRIVE

[75] Inventors: Edgar J. Justus; Arnold J. Roerig, both of Beloit, Wis.

[73] Assignee: Beloit Corporation, Beloit, Wis.

[22] Filed: Aug. 1, 1972

[21] Appl. No.: 277,110

[52] U.S. Cl. .................................................. 29/115
[51] Int. Cl. ............................................. B60b 15/16
[58] Field of Search ............ 29/115, 116 R, 116 AD, 29/113 AD

[56] References Cited
UNITED STATES PATENTS

| | | | |
|---|---|---|---|
| 2,676,387 | 4/1954 | McArr | 29/116 AD X |
| 3,276,102 | 10/1966 | Justus | 29/113 AD X |
| 3,290,897 | 12/1966 | Kuehn | 29/115 X |
| 3,407,679 | 10/1968 | Berzins | 29/115 X |
| 3,419,890 | 12/1968 | Justus | 29/115 |
| 3,562,882 | 2/1971 | Widmer et al. | 29/115 |
| 3,639,956 | 2/1972 | Justus | 29/115 X |

Primary Examiner—Alfred R. Guest
Attorney, Agent, or Firm—Hill, Gross, Simpson, Van Santen, Steadman, Chiara & Simpson

[57] ABSTRACT

A driven roll construction for a controlled deflection roll having a rotatable roll shell mounted on a stationary through shaft with fluid force transmitting means between the roll shell and shaft extending along the length of the roll shell and a ring gear at one end of the roll shell with a driving pinion meshing with the ring gear with herringbone teeth therebetween and a drive shaft driving the pinion through a flexible spline coupling and a support for the drive shaft mounted on the roll shaft.

11 Claims, 2 Drawing Figures

PATENTED JUN 17 1975   3,889,334

CONTROLLED DEFLECTION ROLL DRIVE

BACKGROUND OF THE INVENTION

The present invention relates to improvements in drives for rolls and more particularly to a drive for a controlled deflection roll shell wherein the shell controllably bends with load and the drive accommodates the bending of the roll shell.

Controlled deflection rolls are used commercially in various environments such as in paper making machines, textile machines and other industries where a long roll has to sustain a load and have a controlled deflection. One area of use is in a paper making machine wherein such a roll may be used in a calender stack or press section and forms a paper web processing nip with another roll. The controlled deflection roll is operated so that it maintains a nip of uniform or controlled nonuniform pressure along its nip formed with another roll. Such controlled deflection rolls commonly have a roll shell which is rotatable on a stationary shaft and a fluid force transmitting means is located between the roll shell and shaft so that the shaft is supported uniformly by the fluid along its length. In control of the deflection of the roll, the pressure in the fluid is controlled to match the opposing roll to obtain the desired nip pressure between the controlled deflection roll and the opposing roll. An example of such a roll is in the Justus U.S. Pat. No. 3,276,102.

In such controlled deflection rolls, the roll shell often must be driven to carry the material being processed through the nip. In driving such commercial rolls high horsepower requirements are encountered and these driving forces must be transmitted from a drive to a roll shell which bends in varying amounts during operation thereby tending to misalign the drive which cannot be tolerated at high drive loads. Means have been provided heretofore to accommodate such bending, but these structures have often been complex and space consuming.

It is accordingly an object of the present invention to provide an improved roll drive which will accommodate bending in the roll and yet will be capable of transmitting substantial power through the drive without wear and without frequent attention.

A further object of the invention is to provide an improved drive for a controlled deflection roll wherein the drive utilizes the stationary shaft for support of a portion of the elements and drives through the end of the rolls shell.

A further object of the invention is to provide an improved compact long wearing less expensive drive arrangement for a controlled deflection roll shell wherein the shell can be bent in varying amounts during operation without adversely affecting the drive.

Other objects, advantages and features will become more apparent, as will equivalent structures which are intended to be covered hereby, in the teaching of the principles of the invention in connection with the disclosure of the preferred embodiment thereof in the specification, claims, and drawings in which:

DESCRIPTION OF THE PREFERRED EMBODIMENTS

Figure 1:
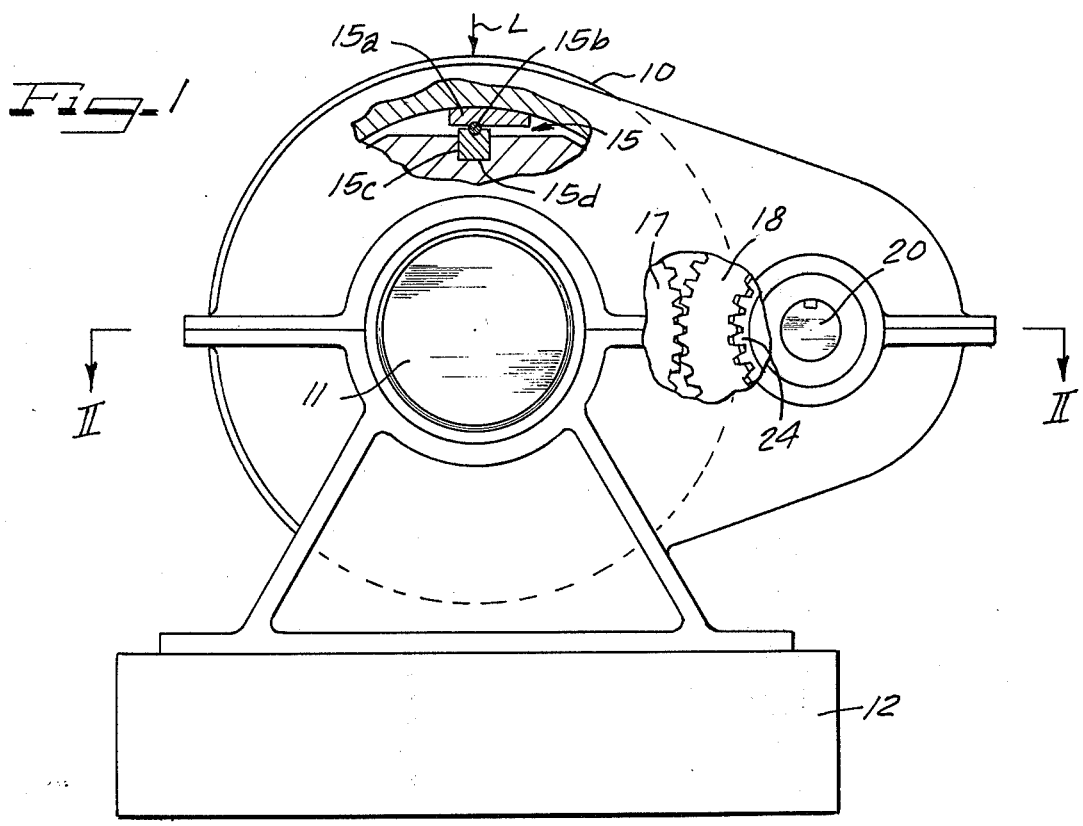
FIG. 1 is an end elevational view of a drive constructed in accordance with the principles of the present invention.
Figure 2:
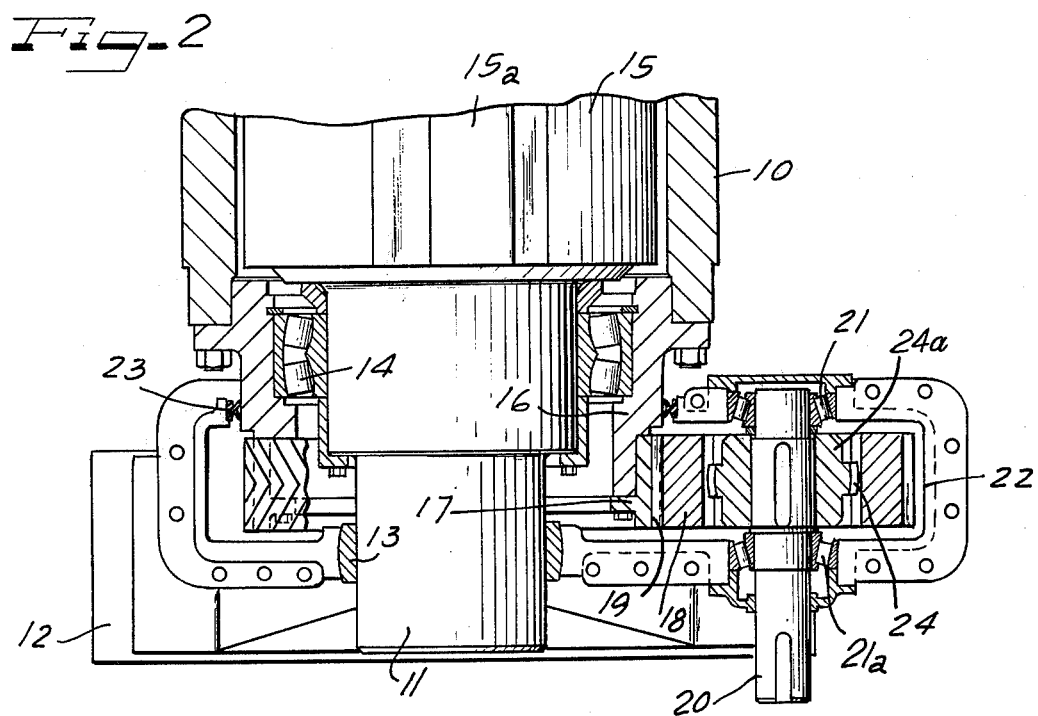
FIG. 2 is a vertical sectional view taken substantially along line II—II of FIG. 1.

A roll shell 10 is supported on a stationary through shaft 11. The stationary shaft is mounted at its ends on frame or floor supported stands 12. An alignment accommodating support 13 mounts the ends of the shaft on the stands 12. A similar stand is located at the other end of the shaft.

Between the roll shell 10 and the shaft 11 is a fluid force transmitting means 15 coextensive with the roll shell. This force transmitting means supports the roll shell on the shaft 11 with uniform pressure along the length of the shell so that a nip load applied vertically at location L is transmitted to the shaft.

In a preferred form the fluid force transmitting means 15 includes a sliding shoe 15a supporting the inner surface of the roll shell through a film of lubricating fluid. The shoe 15a is pivotally supported on a roll pin 15b mounted at the top of an elongate piston 15c carried in a cylinder 15d extending the length of the shaft 11. Fluid pressure is pumped into the cylinder to support the piston and the pressure is selected by a control mechanism not shown to match the force of an opposing load L. In conventional operation, a plain roll supported on end bearings will be applied to the controlled deflection roll at location L, and the plain roll will bend upwardly so that as fluid pressure is applied in the cylinder 15d, the roll shell will bend upwardly to match the nip line of the opposing roll. The curvature or bending of the roll shell 10 will vary in accordance with the total load in the nip.

Positioning bearings 14 are located at the ends of the roll shell 10 between the shaft and shell. These are self-aligning bearings to accommodate independent bowing down of the shaft 11 as the load is transmitted from the roll shell 10 to the shaft 11.

It is to be noted that the supporting bearings 14 are positioned at a location axially displaced from driving gears 17 and 18 so that with load on the roll shell and downward bending of the shaft 11, the distance between the axial center of the shaft 11 and the axis of a ring extension 16 on the roll shell will change.

The roll shell has the ring extension 16 bolted therethrough and the extension carries a ring gear 17 mounted thereon.

In driving meshing engagement with the ring gear is a pinion gear 18 which is located substantially horizontal of the axis of the roll shaft 11.

The pinion gear 18 and ring gear 17 have teeth which maintain them in alignment, and in the preferred form, herringbone gear teeth are employed.

Thus, with bending of the roll shell 10, the axis of the ring gear 17 will bend or tilt and the axis of the pinion gear 18 will similarly tilt and maintain itself in alignment therewith.

To permit changes in alignment of the pinion 18, a drive shaft 20 has a flexible connection to the pinion. This flexible connection is preferably in the form of a self-aligning splined coupling 24 which has teeth on a member 24a on the shaft extending into slots cut in the inner opening of the pinion gear 18.

The shaft 20 is supported in bearings 21 and 21a mounted in a gear housing 22. The gear housing is rigidly supported from the shaft 11. That is, it is carried on the same stand 12 which supports the roll shaft 11 and, therefore, is maintained at a fixed axial position relative to the shaft. As before noted because the housing and its supported bearings 21 and 21a are positioned horizontally of the axis of the shaft 11, and the shaft bends only vertically with load, the axial spacing between the center of the shaft and the center of the pinion 18 will remain constant.

The housing 22 contains lubricant for the bearings and the gear teeth and has a seal 23 which seals against the ring extension 16 of the roll shell.

In operation as a load is applied at L, FIG. 1, a pressure will be applied to the cylinder 15d in accordance with the nip load on the roll shell. The shaft 11 will bend vertically as a function of this pressure in the cylinder 15d, and the roll shell will be bent an amount related to this pressure. With change in these conditions, the bending will vary, but the radial distance between the axes of the pinion 18 and the ring gear 17 will not change because the shaft and shell bend only vertically.

The force losses between the pinion 18 and the ring gear will be at a minimum for high driving efficiency because the gear teeth will be continually in alignment with changing conditions. The structure is rigid and mounted in a position so that the drive forces are transmitted directly to the roll shell. The construction is compact so that it can be built without interfering with adjacent operating mechanisms. The support stand for the roll shaft 11 is utilized as the support for the drive mechanism obtaining unitary and compact structure. The radial load on the drive shaft is relatively low and is directly transmitted to the main support stand which is ruggedly built to carry the load of the shaft 11.

We claim as our invention:

1. A driven roll construction comprising in combination,
    a roll shell,
    support bearing means positioning the roll for rotation,
    an annular ring driving gear on one end of the roll shell for driving the shell in rotation,
    a drive pinion radially of the ring gear in driving mesh therewith,
    said pinion and said ring gear having drive aligning teeth therebetween holding the pinion in alignment with the ring gear,
    a drive shaft,
    and a flexible drive connected directly between the shaft and the pinion.

2. A driven roll construction in accordance with claim 1 wherein said flexible drive includes a flexible spline connection between the drive shaft and pinion.

3. A driven roll construction in accordance with claim 1 wherein said pinion is positioned radially outwardly of said ring gear.

4. A driven roll construction in accordance with claim 1 wherein said flexible drive includes the drive member mounted for rotation on a fixed axis and extending through the pinion and a flexible connection between the drive member and the pinion.

5. A driven roll construction constructed in accordance with claim 1 and including a stationary shaft extending through said roll shell with a fluid force transmitting means between the roll shell and the shaft applying a uniform force to the roll shell in a nip loading direction, and includes a support with the shaft mounted thereon and a drive member mounted on said support.

6. A driven roll construction in accordance with claim 1 wherein said pinion gear is mounted radially outwardly of the ring gear and a housing is provided annularly surrounding the ring gear and enclosing the pinion with a seal between the housing and roll shell for containing lubricant for the gears.

7. A driven roll construction in accordance with claim 1 and including a stationary shaft extending through the roll shell with a deflection control fluid force transmitting means between the shell and shaft opposite a loading location on the roll shell for applying a uniform force to the roll shell along its length.

8. A driven roll construction in accordance with claim 7 wherein the deflection control includes a sliding shoe within the roll shell supported pivotally on a piston and cylinder means on the shaft.

9. A driven roll construction in accordance with claim 1 wherein said pinion is movably mounted in a housing and the flexible drive includes the shaft having a fixed axial position within said housing and a yieldable connection between the shaft and pinion.

10. A driven roll construction comprising in combination,
    a rotatable roll shell,
    a stationary shaft extending through the roll shell,
    support bearing means between the end of the roll shell and the shaft positioning the roll shell for rotation,
    fluid force transmitting means between the roll shell and shaft at one side of the shaft for transmitting a load on the shell to the shaft,
    an annular ring driving gear mounted on an annular extension ring on one end of the roll shell,
    a drive pinion gear radially outwardly of the ring gear in driving mesh therewith,
    said pinion and said ring gear having herringbone teeth therebetween holding the pinion in alignment with the ring gear,
    a housing for the pinion mounted on the stationary shaft,
    a drive shaft supported in the housing for driving the pinion,
    and a flexible spline coupling between the pinion and the drive shaft accommodating axial misalignment between said pinion and said drive shaft.

11. A driven roll construction comprising in combination,
    a roll shell adapted to sustain a vertical load thereon,
    a stationary shaft extending through the roll shell,
    fluid force transferring means between the roll shell and shaft positioned on the top side of the shaft for transmitting the load against the roll shell to the shaft uniformly along the shell, whereby changing fluid pressure in the force transferring means will change the force transmitted between the roll shell and the shaft,
    an annular ring driving gear at one end of the roll shell for driving the shell in rotation,
    a drive pinion gear radially of the ring gear in driving mesh therewith positioned substantially horizontally of the axis of the roll shaft,
    and a flexible drive means for driving said pinion with the pinion axis remaining in alignment with the ring gear axis as the roll shell bends,
    and means on said shaft fixing the radial position of the pinion so that as the roll shell bends relative to the shaft the distance between the axes of the roll shaft and pinion remain substantially constant, and support bearing means between the roll shell and roll shaft positioning the roll for rotation positioned axially offset from said gears so that the vertical distance between the shaft and roll shell changes at the location of the gears with change in fluid pressure between the shell and shaft.

* * * * *